US010551892B1

(12) United States Patent
Shen

(10) Patent No.: US 10,551,892 B1
(45) Date of Patent: Feb. 4, 2020

(54) CENTRALIZED BACKUP POWER MODULE

(71) Applicant: SMART Modular Technologies, Inc., Newark, CA (US)

(72) Inventor: Jinying Shen, San Ramon, CA (US)

(73) Assignee: SMART Modular Technologies, Inc., Newark, CA (US)

( * ) Notice: Subject to any disclaimer, the term of this patent is extended or adjusted under 35 U.S.C. 154(b) by 140 days.

(21) Appl. No.: 15/709,257

(22) Filed: Sep. 19, 2017

(51) Int. Cl.
*G06F 1/26* (2006.01)
*G06F 1/3287* (2019.01)

(52) U.S. Cl.
CPC .............. *G06F 1/263* (2013.01); *G06F 1/266* (2013.01); *G06F 1/3287* (2013.01)

(58) Field of Classification Search
None
See application file for complete search history.

(56) References Cited

U.S. PATENT DOCUMENTS 9,779,016 B1 * 10/2017 Shen .......................... G06F 1/30
2013/0128685 A1 * 5/2013 Shen ....................... G11C 5/141
365/229

\* cited by examiner

*Primary Examiner* — Nitin C Patel
(74) *Attorney, Agent, or Firm* — Wong & Rees LLP

(57) ABSTRACT

Approaches, techniques, and mechanisms are disclosed for a centralized backup power support system that improves testability of non-volatile dual in-line memory modules (NVDIMM) on Automatic Test Equipment (ATE) testers and in-system tests. An NVDIMM includes both volatile memories and non-volatile memories. According to an embodiment, a compact backup power distribution board is powered with an external power supply with an individual protection circuit. The backup power distribution board has an unlimited energy capacity for any density of NVDIMM and zero charge waiting time. According to an embodiment, instead of using an electric double-layer capacitor (EDLC) to support backup power, a resistor is used instead of an EDLC on each backup power module. There is no charging time when the backup power module does not have EDLC cells, resulting in significant reduction in test time and production cost and increase in production output.

18 Claims, 8 Drawing Sheets

CENTRALIZED BACKUP POWER MODULE

TECHNICAL FIELD

Embodiments relate generally to a test system, and, more specifically, to techniques for testing memory modules.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Automatic test equipment (ATE) for testing electronic circuits normally operate under control of a program. The program is loaded in an ATE tester and executes in the hardware of the tester, which generally includes an embedded processor (e.g., a workstation-class microprocessor or any other microcontroller). The embedded processor is often referred to as a central processing unit (CPU) that performs higher-level data management and control functions for the tester. Test programs on a tester for testing large and complex circuits generally are large and complex themselves. These test programs require extensive development and debugging effort by numerous test design engineers. The test programs have to be developed quickly and accurately to meet rapid development times for prototype and production circuits. A program development and execution environment for ATE test programs play an important role in the success of these efforts.

Testers have evolved over the years. Many tester manufacturers have substantial investments in test programs and programming environments. Software for legacy systems cannot simply be replaced by new programming technology because it embodies capabilities that would take a large engineering effort to duplicate in its entirety. On the other hand, legacy systems, being based on old technologies, tend to fail to meet current expectations for performance, features, ease of use, stability, and reliability.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
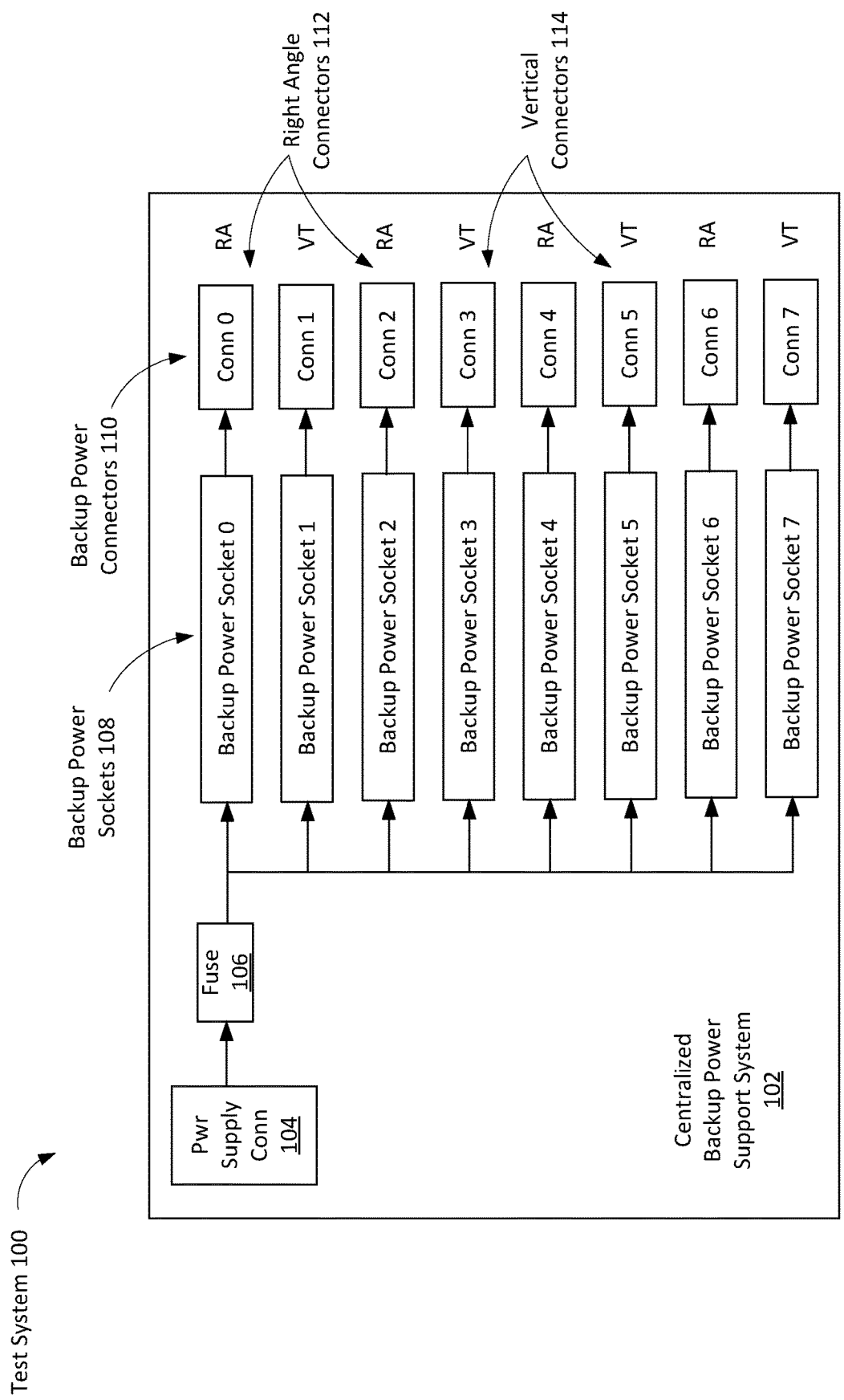
FIG. 1 is an illustrative view of various aspects of an example test system, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
- 1.0. General Overview
- 2.0. System Overview
- 3.0. Structure Overview
  - 3.1. Distribution Board
  - 3.2. Top Isometric View of Centralized Backup Power Support System
  - 3.3. System Diagram of Test System
  - 3.4. Block Diagram of Centralized Backup Power Support System
  - 3.5. Backup Power Module
  - 3.6. Top Isometric View of Test System
  - 3.7. Process Flow
- 4.0. Example Embodiments
- 5.0. Extensions and Alternatives

1.0. General Overview

Approaches, techniques, and mechanisms are disclosed for a centralized backup power support system designed to improve testability of non-volatile dual in-line memory modules (NVDIMM) on Automatic Test Equipment (ATE) testers and in-system boards. An NVDIMM includes both volatile memories (e.g., random-access memories (RAM), synchronous dynamic random-access memories (SDRAM), or any other volatile memory) and non-volatile memories (e.g., NAND flash memories, solid-state memories, or any other electronic non-volatile computer storage media), as examples.

According to an embodiment, a compact backup power distribution board is powered with an external power supply with an individual protection circuit. The power is supplied to each NVDIMM through an individual backup power module (BPM) with a full BPM-NVDIMM serial protocol support. The backup power distribution board has an unlimited energy capacity for any density of NVDIMM and zero charge waiting time. As such, the backup power distribution board fully supports the software (SW) and hardware (HW) full coverage in system tests, without limitations that conventional test systems have on the quantity of NVDIMMs that may be tested in the system, a longer waiting time for BPM charging, BPM aging, and system re-setup for different densities of NVDIMMs due to different BPM density requirement.

According to an embodiment, instead of using an electric double-layer capacitor (EDLC) to support backup power, a resistor is used instead of an EDLC on each backup power module. Among other benefits, self-test function on backup power module is disabled since there is no EDLC on board and a capacitance parameter associated with a backup power module may be set to any capacitance value in firmware (FW) to meet specific energy requirements to support a density of any memory module because an energy source is an external power supply rather than EDLC cells. Furthermore, there is no charging time when the backup power module does not have EDLC cells, resulting in significant reduction in test time and production cost and increase in production output.

According to an embodiment, in the same row of backup power sockets, a backup power socket may be vertically at an offset from another backup power socket. Among other benefits, the offset between the backup power sockets improves optimization of traces on a distribution board for efficiently routing power signals between a power supply connector and the backup power sockets and power signals between the backup power sockets and the backup power connectors.

2.0. System Overview

FIG. 1 is an illustrative view of various aspects of an example test system 100 in which the techniques described herein may be practiced, according to an embodiment. The illustrative view depicts an example of a backup power distribution diagram of test system 100. For example, test system 100 may represent, without limitation, a BPM support system for NVDIMM system level tests. Test system 100 includes a combination of hardware and software configured for testing electronic circuits or boards.

Test system 100 may include a centralized backup power support system 102 that provides an unlimited energy capacity for any density of NVDIMM and zero charge waiting time, without using EDLCs. Existing NVDIMM system level tests require NVDIMM proprietary BPM's to support software (SW) and hardware (HW) full coverages in system tests, which can cause limited NVDIMM quantities per test system, longer waiting time for BPM charging, BPM aging, and system re-setup for different densities of NVDIMMs due to different BPM density requirement.

Centralized backup power support system 102 may include a hardware combination of at least a power supply connector 104, a fuse 106, backup power sockets 108, and backup power connectors 110. For example, centralized backup power support system 102 may include a compact backup power distribution board powered with an external power supply with individual protection circuits in a form factor using a high-speed serial computer expansion bus standard, including but is not limited to, PCIe for easy installation. Backup power is supplied to each NVDIMM through an individual BPM with a complete and specific BPM-NVDIMM protocol supported to simulate or produce a BPM with an unlimited energy capacity for any NVDIMM density and zero charge waiting time.

A cable may be connected to power supply connector 104 and an external power supply for supplying power to backup power sockets 108. This power may be used to generate a backup power that may be supplied through backup power connectors 110 to memory modules. For example, the external power supply may supply any voltage, including but not limited to, 12 volts (V). Also, for example, power supply connector 104 may have any number of pins, including but are not limited to, 8 pins. Further, for example, the external power supply may supply any power parameter, including but not limited to, a power budget of approximately 12 V at 500 milliamps (mA) maximum per slot. For illustrative purposes, the direction of the arrows shown in FIG. 1 indicates the direction of power supplied from an external power supply through power supply connector 104 and fuse 106 to backup power sockets 108 and backup power connectors 110.

Fuse 106 connects to power supply connector 104 and backup power sockets 108. Fuse 106 is a reliable overcurrent protective device, primarily used as a circuit protection device for overcurrents, overloads, or short-circuits. For example, fuse 106 may include a strip of wire that melts and breaks an electric circuit if a current exceeds a predetermined safe level. Also, for example, fuse 106 may support any voltage, including but not limited to, up to 12 V. Further, for example, fuse 106 may support any current, including but is not limited to, up to 5 amperes (A).

All backup power sockets 108 or slots receive power supplied from an external power supply through power supply connector 104 and fuse 106. A backup power module, which controls power supplied from an external power supply to a memory module, may be inserted into a backup power socket 108.

For example, centralized backup power support system 102 may include any number of backup power sockets 108, including but not limited to, 8 sockets. Also, for example, backup power sockets 108 may support any computer system interface protocols, including but is not limited to, Serial Attached SCSI (SAS).

Backup power connectors 110 may be connected to backup power sockets 108. Backup power connectors 110 may have different form factors or physical attributes. For example, backup power connectors 110 may include right-angle connectors 112, denoted as RA, and vertical connectors 114, denoted as VT.

Right-angle connectors 112 may be mounted on a printed circuit board (PCB) of centralized backup power support system 102. Right-angle connectors 112 may be attached to an edge or a peripheral portion of a PCB. Right-angle connectors 112 may have pins with longitudinal bodies substantially parallel to a PCB and exposed on lateral sides of casings of right-angle connectors 112. Cables may be horizontally connected to pins of right-angle connectors 112 from lateral sides of the right-angle connectors 112.

Vertical connectors 112 may be mounted on a printed circuit board (PCB) of centralized backup power support system 102. Vertical connectors 112 may be attached to an edge or a peripheral portion of a PCB. Vertical connectors 112 may have pins with longitudinal bodies substantially perpendicular to a PCB and exposed on top sides of casings of vertical connectors 112. Cables may be vertically connected to pins of vertical connectors 112 at top sides of the vertical connectors 112.

3.0. Structure Overview

3.1. Distribution Board

Figure 2:
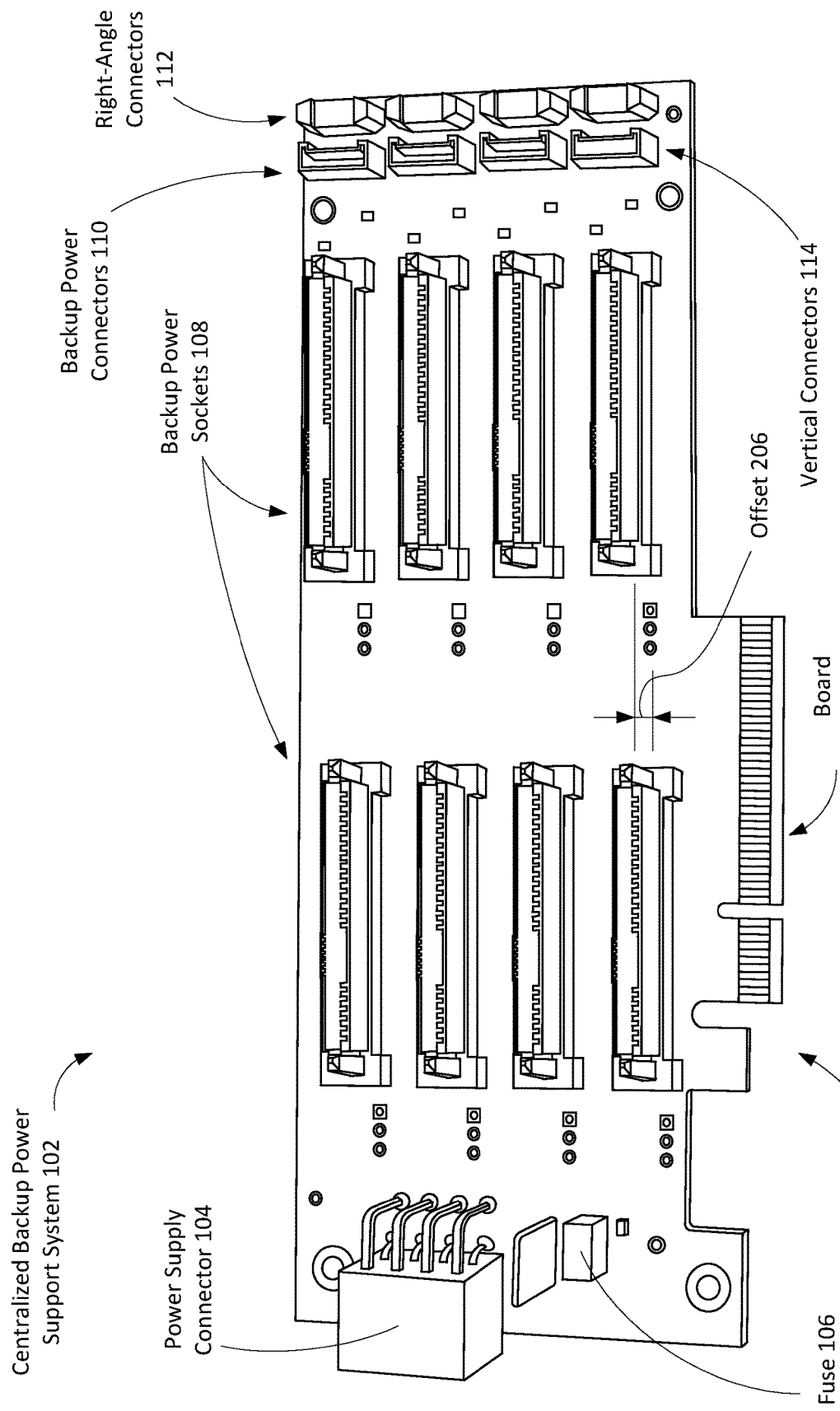
FIG. 2 is a top isometric view of a distribution board of a centralized backup power support system, according to an embodiment.

FIG. 2 is a top isometric view of a distribution board 202 of centralized backup power support system 102, according to an embodiment. Distribution board 202 may be a card having a board connector 204 for communication with another system, which may include, but is not limited to, a motherboard, a PCB, or any other hardware, as examples. Distribution board 202 may be used to supply power for production system test of memory modules.

Distribution board 202 may include any number of backup power sockets 108. For illustrative purposes, backup power sockets 108 are shown in FIG. 2 in a group arranged with 4 backup power sockets 108 in each of 2 columns by 2 rows, although it is understood that distribution board 202 may include any number of backup power sockets 108 in each column and there may be any number of columns and rows of backup power sockets 108. Distribution board 202 may include power supply connector 104 for receiving power from an external power supply for supplying the power through fuse 106 to backup power sockets 108.

Backup power connectors 110 may be connected to backup power sockets 108. The terms "row" and "column" referred to herein refer to a group of backup power sockets 108 arranged horizontally along a length and vertically along a width, respectively, of distribution board 202, whereby the backup power sockets 108 are mounted directly over a side of distribution board 202.

Backup power sockets 108 may be attached vertically staggered with respect to each other. For example, a backup power socket 108 in one column may be at an offset 206 vertically away from and above or below a backup power socket 108 horizontally in another or adjacent column. Backup power sockets 108 may be connected to right-angle connectors 112 and vertical connectors 114. For illustrative purposes, right-angle connectors 112 may be mounted in a single row and vertical connectors 114 in another single row immediately adjacent the single row of the right-angle connectors 112. Among other benefits, offset 206 between backup power sockets 108 provides improved optimization of space usage and traces on distribution board 202 for efficiently routing power and ground signals between power supply connector 104 and backup power sockets 108 and power and ground signals between backup power sockets 108 and backup power connectors 110.

For example, distribution board 202 may be a PCB developed using a reinforcing material of various classes including a paper base class, glass fiber cloth base class, composite epoxy material class, lamination multilayer base class, etc., using a flammability material including flamed-proof type or non-frameproof type, using a copper-clad laminate (CCL) material with an ordinary performance, a low dielectric constant, a high heat resistance, a low coefficient of thermal expansion, etc. Also for example, distribution board 202 may be developed using a flame retardant (FR) material or any other reinforcing material. A flame retardant (FR) material may include, but is not limited to, FR-4 or any other grades of FR material.

For example, distribution board 202 may include any number of layers, including, but are not limited to, 4. Also, for example, distribution board 202 may include any thickness, including, but is not limited to, 1.57 millimeters (mm).

For example, board connector 204 plugs into a socket, a receptacle, an expansion slot, etc. that is mounted on another system or PCB. Also for example, board connector 204 may be implemented using PCIe or any type of connection for communication of internal devices in a computer.

For illustrative purposes, FIG. 2 depicts an example of a hardware implementation of distribution board 202, although it is understood that distribution board 202 may be implemented in any manner. For example, distribution board 202 may be implemented with a different arrangement using a different number of backup sockets, different attachment locations of backup power connectors 110, etc.

3.2. Top Isometric View of Centralized Backup Power Support System

Figure 3:
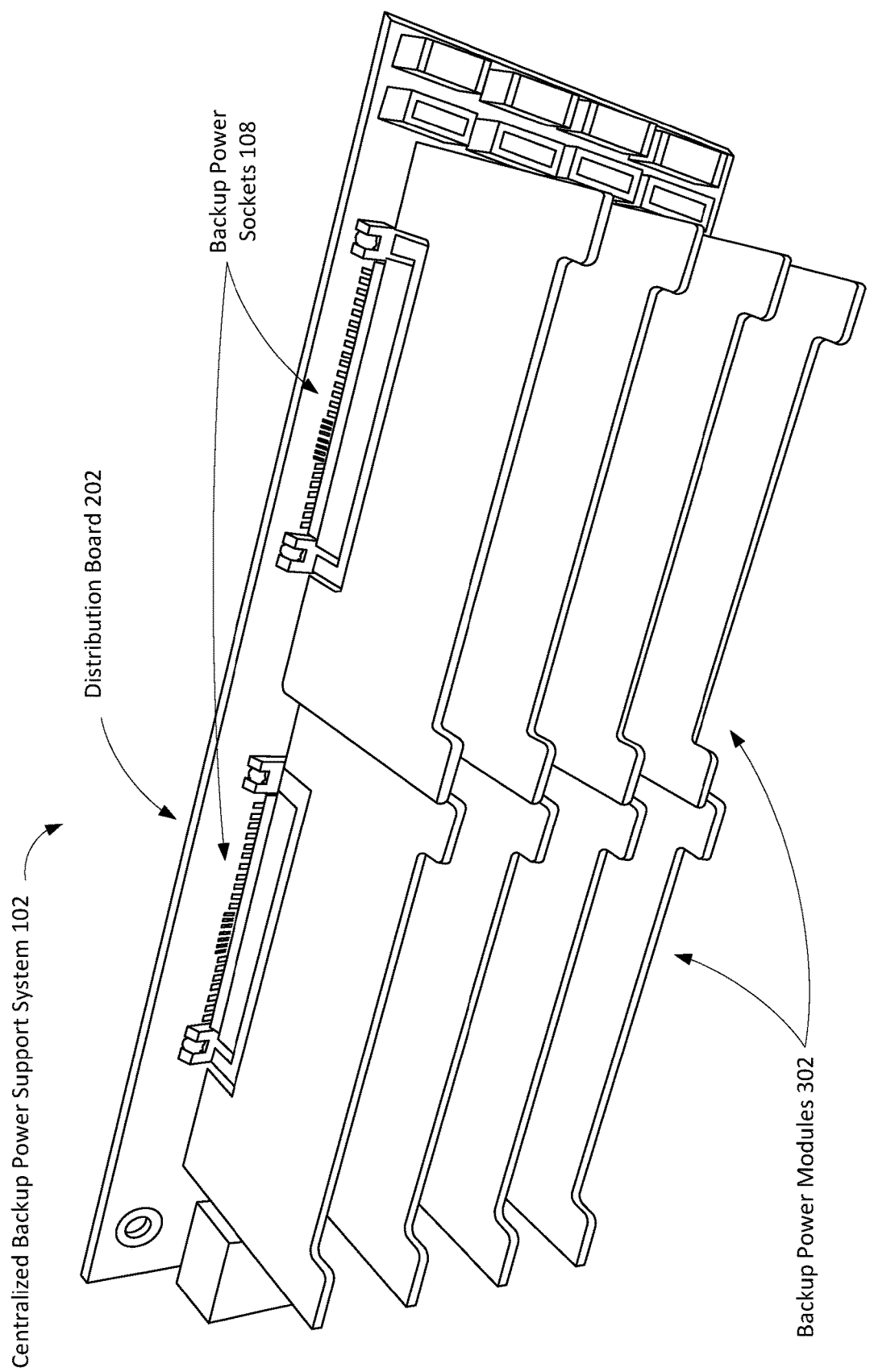
FIG. 3 is a top isometric view of the centralized backup power support system, according to an embodiment.

FIG. 3 is a top isometric view of centralized backup power support system 102, according to an embodiment. Centralized backup power support system 102 includes distribution board 202 and backup power modules 302 plugged or inserted into backup power sockets 108 that are mounted on distribution board 202.

In the same row, backup power modules 302 in one column of backup power sockets 108 may be vertically offset from backup power modules 302 in another column of backup power sockets 108 since a backup power socket 108 in one column may be at an offset 206 vertically away from a backup power socket 108 horizontally in an adjacent column. Each backup power module 302 may have a predefined height or distance from a printed circuit board (PCB) to the top of a card of the backup power module 302 or a predefined length of the card. For example, each backup power module 302 may be a low-profile (LP) or half-length PCI card or any other PCB with specific length and height parameters.

3.3. System Diagram of Test System

Figure 4:
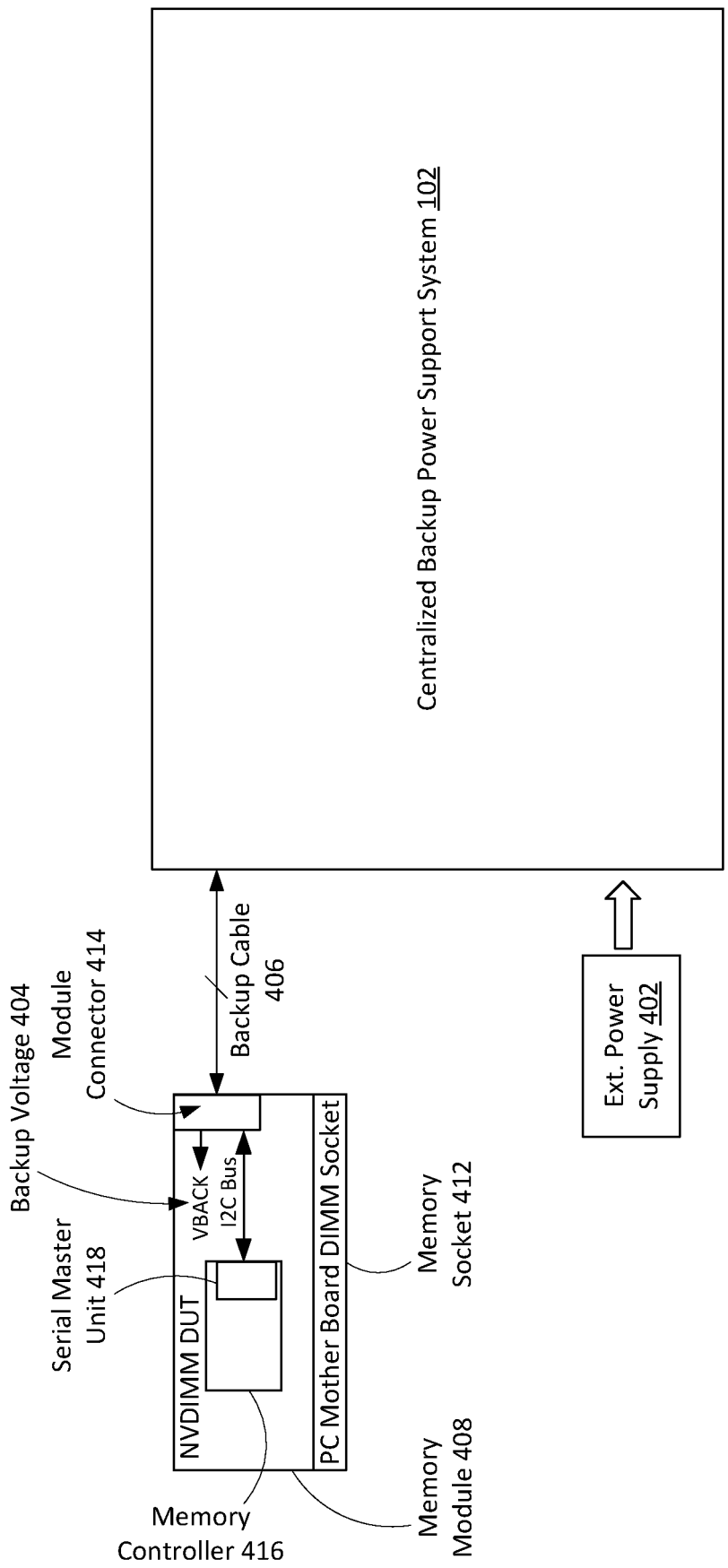
FIG. 4 is a system diagram of the test system, according to an embodiment.

FIG. 4 is a system diagram of test system 100, according to an embodiment. Centralized backup power support system 102 receives power from an external power supply 402. Using the received power, centralized backup power support system 102 generates a backup voltage 404, denoted as VBACK, and sends the backup voltage 404 through a backup cable 406. Backup voltage 404 is supplied to each memory module 408 through backup cable 406. Memory socket 412 may be mounted on a system, which may include, but is not limited to, a motherboard, a PCB, or any other hardware, as examples. A memory module 408 is inserted into a memory socket 412 for testing. The memory module 408 is removed after the testing of the memory module 408 completes. The memory module 408 is transient and replaced with a new memory module 408 after the testing of the memory module 408 completes. Thus, the memory module 408 is not part of centralized backup power support system 102.

Memory module 408 includes a module connector 414, having multiple pins, one of which is for receiving backup voltage 404. Backup voltage 404 is a power source used during testing of a device under test (DUT), such as a memory module 408. For illustrative purposes, only one memory module 408 and only one wire for backup voltage 404 are shown in FIG. 4, although it is understood that centralized backup power support system 102 may include multiple wires of individual backup voltages 404 to supply power to multiple memory modules 408. Backup cable 406 and module connector 414 may include any number of pins or contacts, including but not limited to, 6, as an example.

For example, memory module 408 may be an NVDIMM that includes both volatile memories (e.g., random-access memories (RAM), synchronous dynamic random-access memories (SDRAM), or any other volatile memory) and non-volatile memories (e.g., NAND flash memories, solid-state memories, or any other electronic non-volatile computer storage media). Also for example, memory module 408 may include volatile memories that use double-data rate (DDR) protocols, such as DDR4 synchronous dynamic random-access memories (SDRAM) or any other class of memory integrated circuits used in computers.

Memory module 408 also includes a memory controller 416 with a serial master unit 418, which is a hardware block that communicates with centralized backup power support system 102 to perform functions associated with backup and restore operations. Serial master unit 418 may communicate with centralized backup power support system 102 through backup connector 404 using a serial interface, including, but is not limited to, Inter-Integrated Circuit (I²C) or any other serial protocol interface that connects devices.

3.4. Block Diagram of Centralized Backup Power Support System

Figure 5:
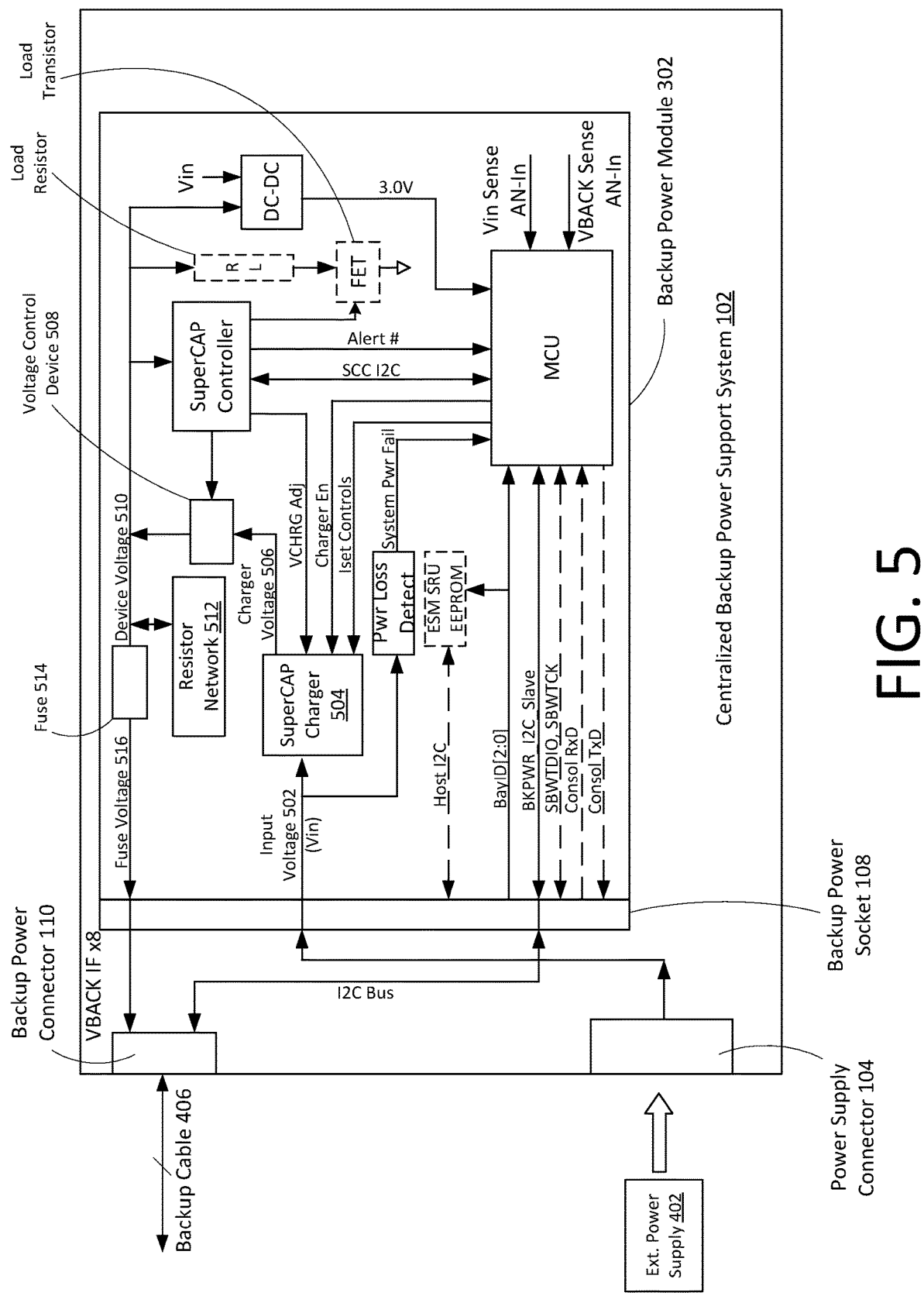
FIG. 5 is a block diagram of the centralized backup power support system, according to an embodiment.

FIG. 5 is a block diagram of centralized backup power support system 102, according to an embodiment. Centralized backup power support system 102 receives power from external power supply 402 and sends backup voltage 404 through backup cable 406 to memory modules 408. For example, centralized backup power support system 102 may be a carrier board with a form factor that supports any computer bus standard, including, but is not limited to, PCIe.

An input voltage 502 is received from external power supply 402 through power supply connector 104 and backup power socket 108. Input voltage 502 is an external power input supplied by external power supply 402 to centralized backup power support system 102.

For example, external power supply 402 may supply any voltage, including but is not limited to, 12 V. Also, for example, input voltage 502 may be any voltage, including but is not limited to, approximately 10.80 V to approximately 13.2 V. Further, for example, backup power socket 108 may have any number of pins, including but are not limited to, 29 pins.

Each backup power module 302 in centralized backup power support system 102 includes a supercapacitor charger 504. Supercapacitor charger 504 is a battery charge controller. Supercapacitor charger 504 may include a constant-frequency synchronous Pulse Width Modulation (PWM) controller with regulation of charge current and voltage. Supercapacitor charger 504 may monitor a battery pack temperature to allow charger only in a preset temperature window. Supercapacitor charger 504 may include a thermal regulation loop that reduces a charge current to maintain a predefined junction temperature during operation of the charger. Supercapacitor charger 504 may automatically enter a low-quiescent current sleep mode when input voltage 502 falls below a battery voltage. Supercapacitor charger 504 may include and charge any selectable number of battery cells, including but not limited to, four cells. The selected number of battery cells may be configured via input pins to supercapacitor charger 504. Supercapacitor charger 504 may generate a charger voltage 506 with a predetermined range, including but not limited to, approximately 9.6 V to approximately 10.6 V.

Backup power module 302 includes a voltage control device 508. Voltage control device 508 functions as a switch. For example, voltage control device 508 may be a junction field-effect transistor (JFET), a bipolar junction transistor (BJT), a unipolar transistor, an insulated gate FET (IGFET), a metal-oxide-semiconductor FET (MOSFET), an insulated-gate bipolar transistor, or any other semiconductor device used to amplify or switch electronic signals or electrical power.

When voltage control device 508 is enabled, voltage control device 508 generates a device voltage 510. Device voltage 510 is generated to be approximately the same as charger voltage 506. For example, device voltage 510 may have a predetermined range, including but not limited to, approximately 9.6 V to approximately 10.6 V.

Backup power modules 302 includes a resistor network 512 connected to voltage control device 508. Resistor network 512 includes a group of resistors that are connected together in series as a voltage divider for non-balancing detection. For example, resistor network 512 may include any number of resistors, including but not limited to 4. One end of resistor network 512 is connected to voltage control device 508, while the other end of resistor network 512 is connected to ground. For example, resistor network 512 in each backup power module 302 may have any resistance value, including but not limited to 1 kiloohm (kΩ).

Backup power module 302 includes a fuse 514 connected to resistor network 512 and voltage control device 508. Fuse 514 provides overcurrent protection of an electrical circuit including voltage control device 508 and each backup power module 302. For example, fuse 514 can be an electronic fuse (eFuse) or any control circuit functional block for avoiding electrical overvoltage, electrical overcurrent, etc.

Fuse 514 may withstand and protect the loads from positive and negative supply voltages. For example, fuse 514 may include integrated back to back FETs to provide reverse current blocking feature that is suitable for systems with output voltage holdup requirements during power fail and brownout conditions. Also, for example, fuse 514 may provide load, source, and device protection with configurable features including, but are not limited to, overcurrent, output slew rate, overvoltage, undervoltage thresholds, etc.

Fuse 514 generates a fuse voltage 516, which is approximately the same as device voltage 510 with a current below a predefined current limit for overcurrent protection. Fuse voltage 516 is sent to backup power socket 108 and then to backup power connector 110. Backup voltage 404 received through module connector 414 of each memory module 408 is approximately the same as fuse voltage 516.

Backup power module 302 may include a supercapacitor controller, a microcontroller unit (MCU), a power loss detection unit, an electrically erasable programmable read-only memory (EEPROM), a load resistor, a load transistor, and a direct-current step-down converter. For illustrative purposes, boxes and lines that are drawn using dashes in FIG. 5 are optional.

The supercapacitor controller controls voltage control device 508 for generation of device voltage 510. The supercapacitor controller may also instruct supercapacitor charger 504 to adjust charger voltage 506 using a voltage charge adjustment signal, denoted as VCHRG Adj. The supercapacitor controller may send a notification to the MCU of backup power module 302 using an alert signal, denoted as Alert #, to alert the MCU when a supercapacitor's voltage or current is below a specific threshold or other events. The symbol "#" referred herein indicates that a signal is active low.

The supercapacitor controller may turn on or off the load transistor connected to ground and the load resistor, which may receive device voltage 510 from voltage control device 508. The direct-current step-down converter, denoted as DC-DC, may also receive device voltage 510, generate a voltage reduced from device voltage 510, and send the reduced voltage to the MCU for powering the MCU. For example, the reduced voltage may be any voltage less than device voltage 510, including but is not limited to, 3.0 V.

The power loss detection unit may monitor input voltage 502 and send a signal to the MCU to indicate if there is a system power failure, denoted as System Pwr Fail. For example, if input voltage 502 falls below a predetermined threshold, the power loss detection unit may report that there is no power. The EEPROM may communicate with memory module 408 through backup power socket 108 and backup power connector 110 using any serial interface, including, but is not limited to, Inter-Integrated Circuit (I²C) or any other serial protocol interface that connects devices.

The EEPROM may be programmed using the serial interface, denoted as Host I2C, to include information or parameters related to memory modules 408, backup power modules 302, centralized backup power support system 102, or a combination thereof. The programmed parameters may be read upon a power up period of centralized backup power support system 102 or during normal operation (e.g., not during a power up period) of centralized backup power support system 102.

The MCU may select the EEPROM using an identification, denoted as Bay ID, that uniquely identifies the EEPROM. For example, the identification may include any number of bits, including, but not limited to, 3. The MCU may select any memory module 408 using the identification. The identification may be used to select which bay or memory socket 412 to interface and at least transfer data and control or status information between the MCU and each memory module 408.

The MCU may interface with memory modules 408 using a serial interface, denoted as BKPWR_I2C_Slave, including, but is not limited to, I²C or any other serial protocol interface that connects devices. For example, the MCU may be a slave and a memory module 408 may be a master in the serial interface.

Each backup power module 302 may include a general-purpose input/output (GPIO) bus as an additional interface for the MCU to communicate with the memory modules 408. For example, the GPIO bus may include at least a clock signal and an input/output data signal. Also, for example, the GPIO bus may include a receive data signal and a transmit data signal, which are denoted as Consol RxD and Consol TxD, respectively. The GPIO bus may be used for transferring data and control or status information between the MCU and each memory module 408. The GPIO bus may also have dedicated signals for special functions to development. For example, a Spy-Bi-Wire (SBW) Joint Test Action Group (JTAG) bus may include at least a test clock (TCK) signal and a test data input/output (TDIO) signal, which are denoted as SBWTCK and SBWTDIO, for debug of backup power modules 302.

The MCU may monitor an input voltage, denoted as Vin Sense AN-In, such as input voltage 502. The MCU may monitor a backup voltage, denoted as VBACK Sense AN-In, such as fuse voltage 516. Based on values of input voltage 502 and fuse voltage 516, the MCU may enable supercapacitor charger 504 to charge using a charger enable signal, denoted as Charger En. Based on values of input voltage 502 and fuse voltage 516, the MCU may send a charge setting parameter to supercapacitor charger 504. For example, the charge setting parameter may control a charge rate or a charging current of supercapacitor charger 504.

For example, centralized backup power support system 102 may include any number of backup power modules 302, including but are not limited to, 8 independent backup power modules 302. Also, for example, each backup power socket 108 may have a specific or predefined custom pinout of connector contacts or pins for power source input, backup power output, and a serial interface to memory module 408, whereby the pinout is different from a pinout of a connector that supports a standard computer system interface protocol including, but is not limited to, SAS.

Instead of using electric double-layer capacitors (EDLC) to support backup power, resistor network 512 is used to replace the EDLC on each backup power module 302. Among other benefits, self-test function on backup power module 302 may be disabled since there is no EDLC on board and a capacitance parameter associated with backup power module 302 may be set to any capacitance value in firmware (FW) to meet specific energy requirements to support a density of any memory module 408 because an energy source is an external power supply rather than EDLC cells. A target NVDIMM controller, such as memory controller 416, may include a built-in dedicated serial master, such as serial master unit 418, to communicate with backup power module 302, which may be a serial slave device.

The NVDIMM controller may keep polling a status of backup power module 302 that indicates if backup power module 302 is fully charged and ready for a power loss to determine if memory module 408 can be in a non-volatile mode, which is a condition of memory module 408 when all data in volatile memories of memory module 408 can be stored or backed up into non-volatile memories of memory module 408 when a system power failure occurs so that all of the data or contents are protected and not lost. If there is a system power failure and backup power module 302 is not ready yet, and memory module 408 is not in a non-volatile mode, data in volatile memories of memory module 408 may not be stored or backed up into non-volatile memories of memory module 408 because of backup power module 302 not ready yet. A volatile mode is a condition of memory module 408 when the memory module 408 is not ready to get into a non-volatile mode yet, while data in volatile memories of memory module 408 may be lost when a system power failure occurs such that all of the data or contents are not in a protected state from a power loss.

Backup power module 302 is implemented without energy storage EDLC cells using hardware blocks of, at least, the MCU, supercapacitor charger 504, resistor network 512, the supercapacitor controller, fuse 514, and so forth. The MCU is used for supervision of an overall operation of backup power module 302. Supercapacitor charger 504 properly generates a specific voltage, such as charger voltage 506, to sufficiently support memory modules 408 having different densities and power requirements. Resistor network 512 replaces EDLC, which is typically used in existing test systems that support backup power. Fuse 514 is an output protection circuit for a backup voltage power, such as device voltage 510.

The supercapacitor controller monitors device voltage 510 and controls supercapacitor charger 504 to adjust charger voltage 506 and alerts the MCU. For example, the supercapacitor controller may send an alert to the MCU when there is an overcurrent in the device voltage 510. In response to the alert, the MCU may disable supercapacitor charger 504 by deasserting the charger enable signal.

A regular or conventional backup power module (BPM) draws power from the same system as NVDIMMs through either an NVDIMM-BPM connection cable or other interfaces. The regular BPM starts charging an EDLC cell stack to a full charge state, which reaches a predefined voltage and meets a predefined taper current threshold. During a system power-on period, it may take a couple of minutes to several minutes for the regular BPM to power up. Sizes of required EDLC cells in the regular BPM often vary in many different applications because the sizes can be smaller or larger depending on different NVDIMM densities. Discharge of an EDLC stack is required to provide an NVDIMM power for backup using the regular BPM. The regular BPM can be applicable in a real application scenario in the field or in a production system at a customer site, but it is not a good option for production test because it will consume more test station space, take a longer test time, and require a change per NVDIMM density. In addition, an EDLC has reliability problems because of aging issues from time to time and cycle to cycle.

Resistor network 512 may be used by a test system that uses a regular BPM by replacing an EDLC on a board of the regular BPM with resistor network 512. With this modification, the regular BPM does not have EDLC cells in a well-balanced state and thus is powered only by a dedicated power source. Without EDLC cells, a BPM, such as backup power module 302, immediately has a full charge state, a fixed voltage on resistor network 512, approximately the same voltage drop across each resistor in resistor network 512, and a current through resistor network 512 under a tapper current threshold, which is very small such as that of a leakage current of an EDLC cell that is fully charged. In the full charge state, a backup voltage, such as fuse voltage 516, is above a predefined voltage level. Also in the full charge state, supercapacitor charger 504 tapers a charging current below a predefined current level.

Among other benefits, there is no charging time when backup power module 302 does not have EDLC cells, resulting in significant reduction in test time and production cost and increase in production output. When a memory module 408 in a system loses power, backup power module 302 provides backup power by generating charger voltage 506 using supercapacitor charger 504 and propagating the charger voltage 506 through voltage control device 508 and fuse 514 to memory module 408, whereby the charger voltage 506 is a continuous power source without time and capacity limitations, making it possible to meet any density of an NVDIMM. Also, among other benefits, embodiments of the invention provide a universal backup power solution to support an NVDIMM system level test on a mass production floor with technical features that include at least an NVDIMM-BPM communication scenario that is the same as a real application in the field, and a compact backup power module for all NVDIMM densities in a system level test without EDLC energy cells, which is safe for open frame production test environment.

3.5. Backup Power Module

Figure 6:
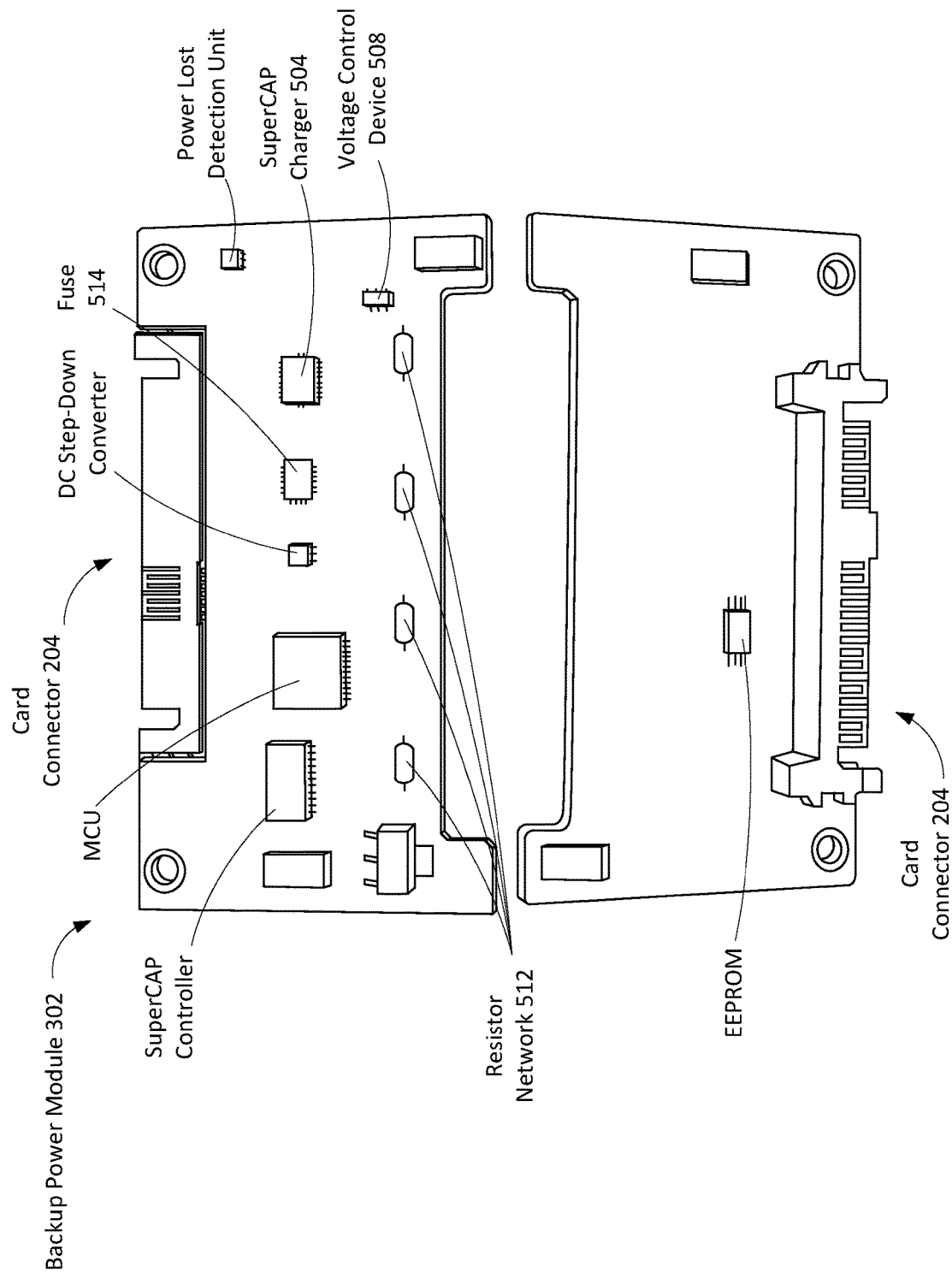
FIG. 6 is an isometric view of a backup power module, according to an embodiment.

FIG. 6 is an isometric view of backup power module 302, according to an embodiment. Supercapacitor charger 504 may be mounted next to voltage control device 508 on a PCB of backup power module 302. Voltage control device 508 may be enabled by the supercapacitor controller to generate device voltage 510, which includes a voltage value substantially the same as that of charger voltage 506 when voltage control device 508 is on.

Load resistors may be mounted close to voltage control device 508 so that the load resistors may be connected to device voltage 510. A load transistor may be connected to each load resistor. Fuse 514 may be connected and mounted adjacent to voltage control device 508 to receive device voltage 510 and propagate it to fuse voltage 516 to be sent to backup power socket 108 as a backup power for memory modules 408. The DC step-down converter may be mounted close to receive device voltage 510 from voltage control device 508 to receive device voltage 510 and generate a reduced voltage lower than device voltage 510 and feed the reduced voltage to the MCU as a power source.

The power loss detection unit may be mounted next to card connector 204 to receive input voltage 502 to determine if there is a system power failure. The MCU may also be mounted next to card connector 204 to receive and transmit signals through serial interface busses connected to memory module 408. The MCU may receive the system power failure from the power loss detection unit. When the system power failure occurs, the MCU may enable supercapacitor charger 504 to charge and control current setting of an output power of supercapacitor charger 504. The EEPROM may be connected to the MCU so that it may be selected for storing information or parameters related to memory modules 408, backup power modules 302, centralized backup power support system 102, or a combination thereof.

For illustrative purposes, FIG. 6 depicts an example of a hardware implementation of backup power module 302, although it is understood that backup power module 302 may be implemented in any manner. For example, backup power module 302 may be implemented with a different arrangement using a different number of load resistor packs, a different location of the MCU, etc.

3.6. Top Isometric View of Test System

Figure 7:
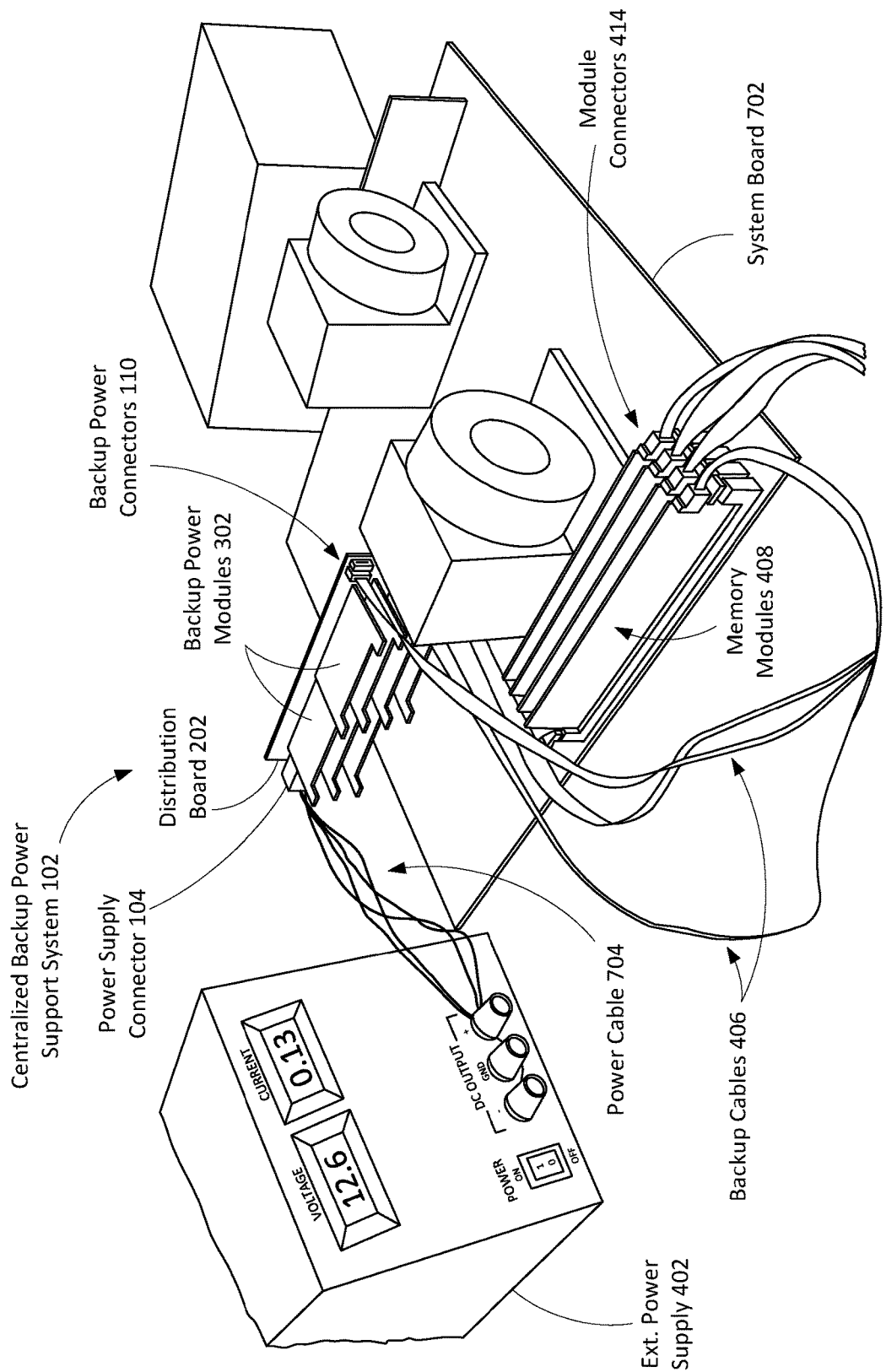
FIG. 7 is a top isometric view of the centralized backup power support system, according to an embodiment.

FIG. 7 is a top isometric view of test system 100, according to an embodiment. FIG. 7 depicts an example of a system level test setup of memory modules 408 using centralized backup power support system 102.

Test system 100 may include a system board 702 having a socket in which distribution board 202 may be inserted. System board 702 may have sockets in which memory modules 408 may be inserted. For example, system board 702 may be a personal computer (PC) mother board, a server PC mother board, or any other PCB with multiple dual in-line memory module (DIMMs) slots. Memory modules 408 are inserted into memory sockets 412 mounted on system board 702 for testing.

External power supply 402 may provide power to distribution board 202 through power supply connector 104. Backup power modules 302 that are mounted on distribution board 202 may receive the power from external power supply 402 and supply it to memory modules 408 through backup power connectors 110 and backup cables 406 that are attached to backup power connectors 110 and module connectors 414 mounted on memory modules 408. All backup power modules 302 in centralized backup power support system 102 are independent to support its link partners through individual cables.

For example, external power supply 402 may be a bench top power supply used for a centralized backup power module (BPM) support system. Also, for example, memory modules 408 may be NVDIMM DUTs that are tested in test system 100.

3.7. Process Flow

Figure 8:
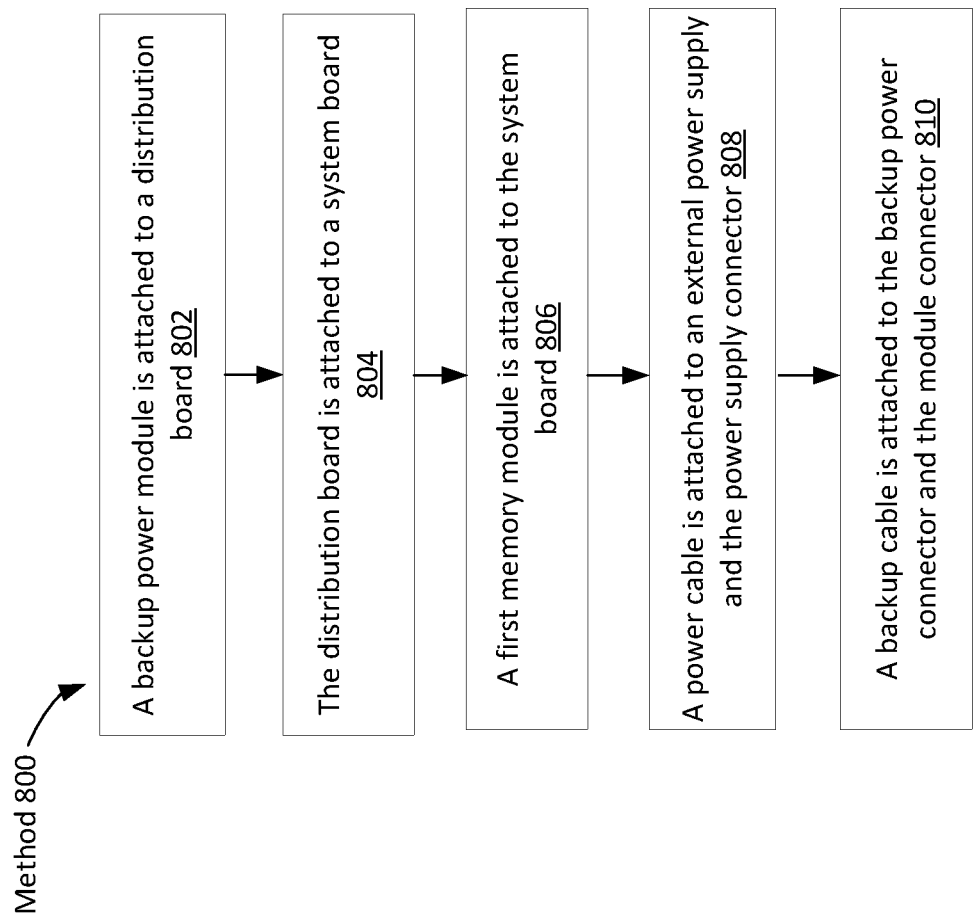
FIG. 8 is an example process flow for utilizing the centralized backup power support system, in accordance with one or more embodiments.

FIG. 8 is an example process flow 800 for test system 100, in accordance with one or more embodiments. Flow 800 may be implemented, for example, in a computer system such as system 100. FIG. 8 illustrates only one possible flow for practicing the described techniques. Other embodiments may include fewer, additional, or different elements, in varying arrangements. Moreover, it will be recognized that the sequence of blocks is for convenience in explaining the process flow only, as the blocks themselves may be performed in various orders and/or concurrently.

In block 802, a backup power module, such as backup power module 302, is attached to a distribution board, such as distribution board 202. The backup power module includes a supercapacitor charger, a voltage control device, a first resistor in a resistor network, and a fuse, such as supercapacitor charger 504, voltage control device 508, a first resistor in resistor network 512, and fuse 514, respectively, without an electric double-layer capacitor (EDLC). The backup power module includes the first resistor in the resistor network instead of the EDLC. The supercapacitor charger is directly connected to the voltage control device. The voltage control device is directly connected to the resistor and the fuse.

The distribution board includes a backup power connector, such as backup power connector 110, mounted at an edge of the distribution board for ease of installation thereof. The distribution board includes a power supply connector, such as power supply connector 104, mounted at an edge of the distribution board.

The distribution board includes backup power sockets, such as backup power sockets 108, mounted in a central or interior portion of the distribution board. The backup power sockets are attached in multiple rows and columns. One of the backup power sockets in one column is at an offset, such as offset 206, vertically away from and above or below another of the backup power sockets that is horizontally in another or adjacent column.

The backup power module is attached or inserted into one of the backup power sockets. The supercapacitor charger and the fuse are directly connected to the one of the backup power sockets.

In an embodiment, the backup power module includes a second resistor in the resistor network, such as a second resistor in resistor network 512. The second resistor is connected in series with the first resistor.

In an embodiment, the backup power connector is attached to a first side of the distribution board. The power supply connector is attached to a second side of the distribution board. The first side is opposite to the second side.

In an embodiment, the voltage control device is a field-effect transistor (FET).

In an embodiment, the fuse is an electronic fuse (eFuse).

In block 804, the distribution board is attached to a system board, such as system board 702.

In an embodiment, the distribution board is substantially perpendicular to the system board. The backup power module is substantially parallel to the system board.

In block 806, a first memory module, such as memory module 408, is attached to the system board.

In an embodiment, a second memory module, such as memory module 408, is attached to the system board. The second memory module includes a density that is different from a density of the first of the memory modules. The term density used herein refers to a capacity in terms of number of bits of information that can be stored in a memory module.

Each of the first and second memory modules includes volatile memories and non-volatile memories. Each of the first and second memory modules includes a module connector, such as module connector 414, mounted at an edge thereof.

In block 808, a power cable, such as power cable 704, is attached to an external power supply, such as external power supply 402, and the power supply connector.

The supercapacitor charger receives an input voltage, such as input voltage 502, from the external power supply through the power supply connector and the backup power socket.

The supercapacitor charger generates a charger voltage, such as charger voltage 506. The charger voltage is less than the input voltage.

The voltage control device is enabled to generate a device voltage, such as device voltage 510. The device voltage is approximately the same as the charger voltage.

The fuse generates a fuse voltage, such as fuse voltage 514. The fuse voltage is approximately equal to the device voltage.

In block 810, a backup cable, such as backup cable 406, is attached to the backup power connector and the module connector. The backup power connector is either a right-angle connector, such as right-angle connector 112, or a vertical connector, such as vertical connector 114.

The fuse voltage is carried through the backup cable and the module connector to the memory module. The fuse voltage is used as a backup voltage, such as backup voltage 404, for supplying power to the memory module during testing thereof.

4.0. Example Embodiments

Examples of some embodiments are represented, without limitation, in the following clauses:

According to an embodiment, an apparatus comprises a distribution board, a power supply connector on the distribution board for connecting to an external power supply, a backup power connector on the distribution board for connecting to a memory module inserted into a memory socket, and a backup power module attached to the distribution board. The backup power module includes a circuit with a resistor instead of a capacitor for generating a backup voltage for supplying power through the backup power connector to the memory module, and the backup voltage is based on an input voltage supplied from the external power supply through the power supply connector.

In an embodiment, the backup power module includes a fuse directly connected to the resistor, the fuse generates a fuse voltage based on the input voltage, and the fuse voltage is carried through the backup power connector for the memory module to use as the backup voltage.

In an embodiment, the distribution board includes a trace connected to the backup power module and the backup power connector for communication between the backup power module and the memory module using a serial protocol.

In an embodiment, the backup power connector is a vertical connector.

In an embodiment, the apparatus further comprises backup power sockets on the distribution board, and one of the backup power sockets is at an offset vertically away from another of the backup power sockets.

In an embodiment, the apparatus further comprises backup power sockets on the distribution board, and the backup power module is inserted into one of the backup power sockets.

In an embodiment, the backup power module includes a supercapacitor charger that receives the input voltage and generates a charger voltage, the supercapacitor charger is directly connected to the one of the backup power sockets, the charger voltage is less than the input voltage, and the backup voltage is generated based on the charger voltage.

According to an embodiment, an apparatus comprises a system board, a distribution board attached to the system board, a power supply connector on the distribution board, a backup power connector on the distribution board for connecting to a memory module inserted into a memory socket on the system board, a backup power module attached to the distribution board, the backup power module having a circuit with a resistor instead of capacitor for generation of a backup voltage for supplying power through the backup power connector to the memory module, a power cable connected to an external power supply and the power supply connector, and a backup cable connected to the backup power connector and the module connector.

In an embodiment, the distribution board includes a backup power socket at an interior portion of the distribution board, and the backup power module is inserted into the backup power socket.

In an embodiment, the distribution board is substantially perpendicular to the system board.

In an embodiment, the backup power module is substantially parallel to the system board.

In an embodiment, the distribution board includes backup power sockets mounted at an interior portion of the distribution board.

In an embodiment, the distribution board includes backup power sockets arranged in multiple rows, and in each of the rows, one of the backup power sockets is adjacent to and vertically at an offset from another of the backup power sockets.

In an embodiment, the backup power module includes the circuit with a second resistor in series with the resistor for generation of the backup voltage.

According to an embodiment, a method of manufacture of a backup power support system comprises mounting a power supply connector on a distribution board for connecting to an external power supply, mounting a memory socket on the distribution board, mounting a backup power connector on the distribution board for connecting to a memory module inserted into the memory socket, and attaching a backup power module to the distribution board. The backup power module includes a circuit with a resistor instead of a capacitor for generating a backup voltage for supplying power through the backup power connector to the memory module, and the backup voltage is based on an input voltage supplied from the external power supply through the power supply connector.

In an embodiment, the backup power module includes a fuse directly connected to the resistor for generation of a fuse voltage based on the input voltage, and the fuse voltage is carried through the backup power connector for the memory module to use as the backup voltage.

In an embodiment, the method further comprises mounting backup power sockets on the distribution board, and one of the backup power sockets is at an offset vertically away from another of the backup power sockets.

In an embodiment, the method further comprises mounting backup power sockets on the distribution board, and wherein attaching the backup power module includes inserting the backup power module into one of the backup power sockets.

Other examples of these and other embodiments are found throughout this disclosure.

5.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus comprising:
    a distribution board;
    a power supply connector on the distribution board that connects to an external power supply;
    a backup power connector on the distribution board for connecting to a memory module inserted into a memory socket; and
    a backup power module attached to the distribution board, the backup power module having a circuit with a resistor instead of a capacitor, the circuit configured to generate a backup voltage to supply power through the backup power connector to the memory module, the backup voltage based on an input voltage supplied from the external power supply through the power supply connector, the backup power module including a fuse directly connected to the resistor for generation of a fuse voltage based on the input voltage, and the fuse voltage is available at the backup power connector for the memory module to use as the backup voltage.

2. The apparatus as recited in claim 1, wherein the distribution board includes a trace connected to the backup power module and the backup power connector for communication between the backup power module and the memory module using a serial protocol.

3. The apparatus as recited in claim 1, wherein the backup power connector is a vertical connector.

4. The apparatus as recited in claim 1, further comprising backup power sockets on the distribution board, one of the backup power sockets at an offset vertically away from another of the backup power sockets.

5. The apparatus as recited in claim 1, further comprising:
    backup power sockets on the distribution board; and
    wherein the backup power module is inserted into one of the backup power sockets.

6. The apparatus as recited in claim 5, wherein the backup power module includes a supercapacitor charger that receives the input voltage and generates a charger voltage, the supercapacitor charger is directly connected to the one of the backup power sockets, the charger voltage is less than the input voltage, and the backup voltage is generated based on the charger voltage.

7. An apparatus comprising:
    a system board;
    a distribution board attached to the system board;
    a power supply connector on the distribution board;
    a backup power connector on the distribution board that connects to a memory module inserted into a memory socket on the system board;
    a backup power module attached to the distribution board, the backup power module having a circuit with a resistor instead of capacitor, the circuit configured to generate a backup voltage for supplying power through the backup power connector to the memory module, the backup power module including a fuse directly connected to the resistor for generation of a fuse voltage based on the input voltage, and the fuse voltage is available at the backup power connector for the memory module to use as the backup voltage;

a power cable connected to an external power supply and the power supply connector; and a backup cable connected to the backup power connector and the module connector.

8. The apparatus as recited in claim 7, wherein:

the distribution board includes a backup power socket at an interior portion of the distribution board; and the backup power module is inserted into the backup power socket.

9. The apparatus as recited in claim 7, wherein the distribution board is perpendicular to the system board.

10. The apparatus as recited in claim 7, wherein the backup power module is parallel to the system board.

11. The apparatus as recited in claim 7, wherein the distribution board includes backup power sockets mounted at an interior portion of the distribution board.

12. The apparatus as recited in claim 7, wherein the distribution board includes backup power sockets arranged in multiple rows, and in each of the rows, one of the backup power sockets is adjacent to and vertically at an offset from another of the backup power sockets.

13. The apparatus as recited in claim 7, wherein the backup power module includes the circuit with a second resistor in series with the resistor for generation of the backup voltage.

14. A method of manufacture of a backup power support system, comprising:

mounting a power supply connector on a distribution board for connecting to an external power supply;

mounting a backup power connector on the distribution board for connecting to a memory module inserted into a memory socket; and attaching a backup power module to the distribution board, the backup power module having a circuit with a resistor instead of a capacitor, the circuit generates a backup voltage for supplying power through the backup power connector to the memory module, the backup voltage based on an input voltage supplied from the external power supply through the power supply connector, the backup power module including a fuse directly connected to the resistor for generation of a fuse voltage based on the input voltage, and the fuse voltage is available at the backup power connector for the memory module to use as the backup voltage.

15. The method as recited in claim 14, wherein the distribution board includes a trace connected to the backup power module and the backup power connector for communication between the backup power module and the memory module using a serial protocol.

16. The method as recited in claim 14, wherein the backup power connector is a vertical connector.

17. The method as recited in claim 14, further comprising mounting backup power sockets on the distribution board, one of the backup power sockets at an offset vertically away from another of the backup power sockets.

18. The method as recited in claim 14, further comprising:

mounting backup power sockets on the distribution board; and wherein attaching the backup power module includes inserting the backup power module into one of the backup power sockets.

* * * * *